Oct. 28, 1952 — E. F. WILSON — 2,615,506
FLUID PRESSURE ACTUATED TIRE CHANGER WITH CIRCUMFERENTIALLY DISTRIBUTED THRUST MEANS
Filed May 24, 1948 — 2 SHEETS—SHEET 1

Earl F. Wilson
INVENTOR.

Oct. 28, 1952  E. F. WILSON  2,615,506
FLUID PRESSURE ACTUATED TIRE CHANGER WITH CIRCUMFERENTIALLY
DISTRIBUTED THRUST MEANS
Filed May 24, 1948  2 SHEETS—SHEET 2
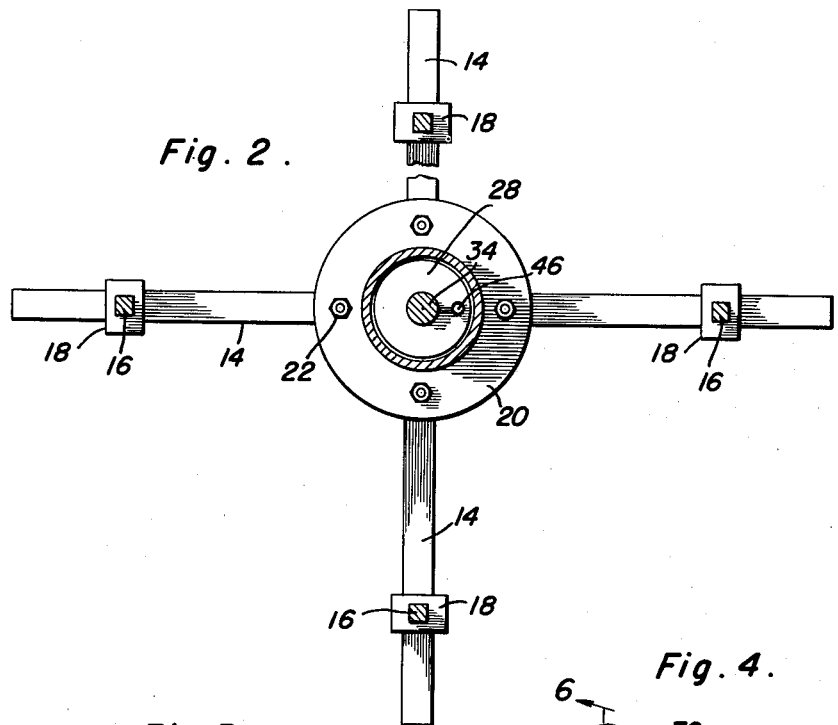
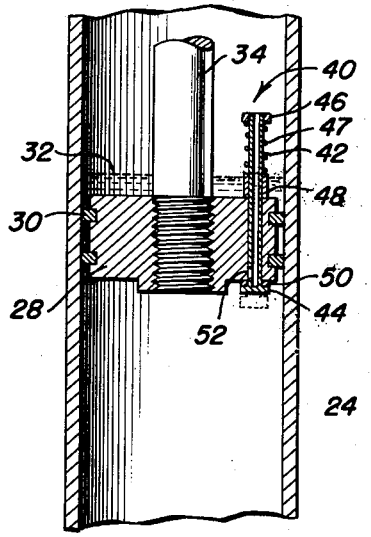
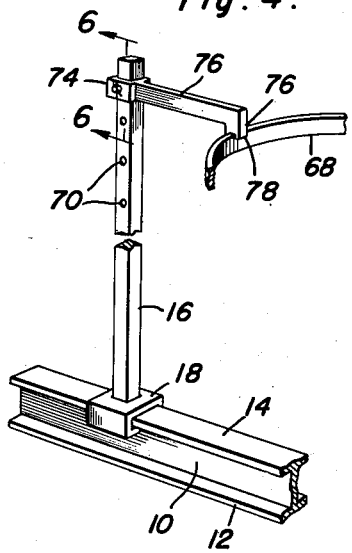
Earl F. Wilson
INVENTOR.

Patented Oct. 28, 1952

2,615,506

UNITED STATES PATENT OFFICE 2,615,506

FLUID PRESSURE ACTUATED TIRE CHANGER WITH CIRCUMFERENTIALLY DISTRIBUTED THRUST MEANS

Earl F. Wilson, Carlton, Oreg., assignor of forty per cent to Claude I. Wilson, Davenport, Iowa Application May 24, 1948, Serial No. 28,802

1 Claim. (Cl. 157—1.2)

This invention relates generally to garage equipment, and more particularly to a tire changer designed to be operated by compressed air and used to mount and to demount tires onto and from rims of vehicle wheels, and more especially for use with heavy tires such as are used on trucks.

A primary object of this invention is to provide a tire changer which is very readily adjusted for use with different sized wheels and tires, and which will materially decrease the amount of labor incident to the mounting and demounting of tires.

Another object of this invention, is to provide a tire changer in which a characteristic chattering or vibration of the wheel and tire, against a rigid pressure equalizing ring can be achieved, this action corresponding substantially with the recognized effective hammering of the tire while pressure is being applied thereto, especially in the removal of tires which have become bonded to a rim by the accumulation of rust and other matter or by the chemical breakdown of the rubber causing adherence of the tire to the rim.

Still another object of this invention is to provide, in a tire changer, means to allow the use of the wheel supporting member at different heights above the base portion of the machine, thus allowing for easier placement of the tire and wheel assembly upon the said support, a feature which is particularly valuable in connection with operation upon wheels and tires of considerable weight.

Still another object of this invention is to provide a tire changer of the type mentioned above which will automatically release the pressure on a reciprocating wheel support when the support has reached a given height relative to other portions of the machine, this release of pressure being accomplished by novel and simplified means.

And a last object to be mentioned specifically is to provide a tire changer in which several structural details have been incorporated leading to more efficient operation of the machine, relatively economical and simple manufacture of the machine, and attaining a machine which will give generally efficient and durable service.

With these objects definitely in view, this invention resides in certain novel features of construction, combination and arrangement of elements and portions as will be hereinafter described in this specification, particularly pointed out in the appended claim, and illustrated in the accompanying drawings, in which:

Figure 2 is a horizontal sectional view, taken substantially upon the line 2—2 in Figure 1;

Figure 3 is a fragmentary vertical sectional view, showing the cylinder, piston and valve assembly on a slightly enlarged scale;

Figure 4 is a free dimensional view, fragmentary in character, showing a portion of the base of the machine, an upright with an arm adjustably mounted thereon and a portion of the tire engaging equalizing ring;

Similar characters of reference designate similar or identical elements and portions throughout the specification and throughout the several views of the drawings.

Figure 1:
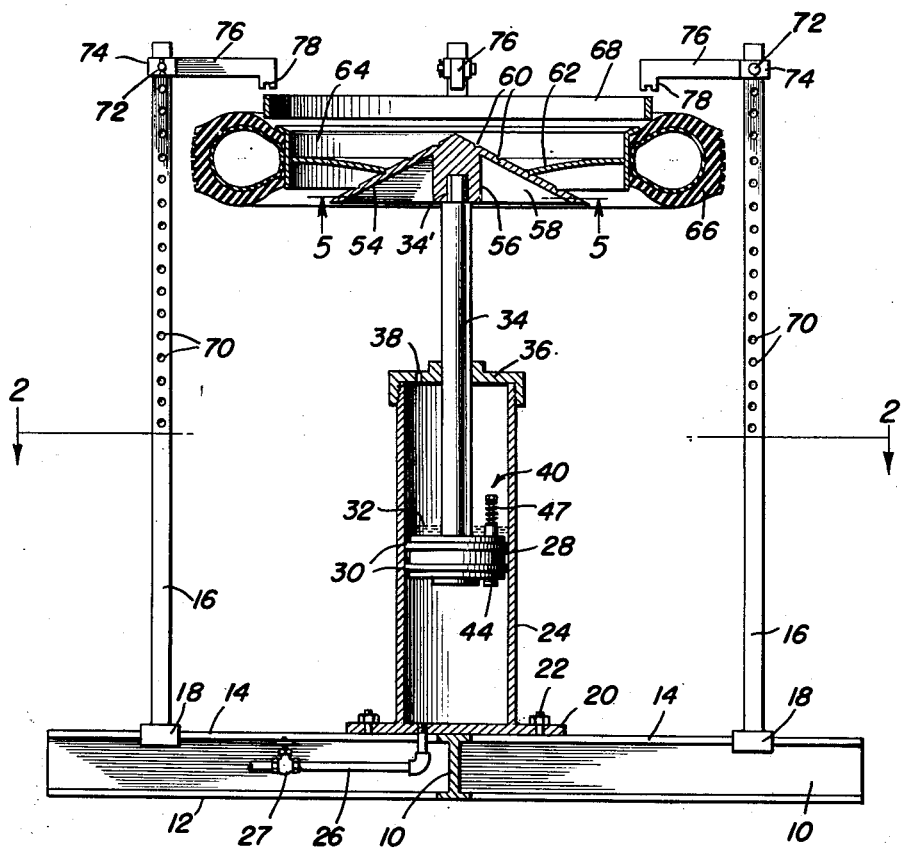
Figure 1 is a vertical sectional view of the assembled machine with a wheel and tire operatively mounted thereon, as when a tire is being removed from a wheel.
Figure 6:
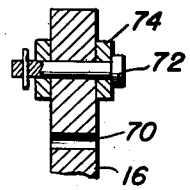
Figure 6 is a fragmentary enlarged detail view, sectional in character, of an upper end portion of one of the uprights.

Referring now to the drawings in detail, this invention includes a base which is represented as being horizontally disposed and comprised of crossed I-beams 10, the bottom flange 12 of each I-beam comprising floor or ground engaging members, while the upper flanges 14 of the I-beams are utilized to support uprights 16. The uprights 16 are adjustably mounted, radially of the base, by shoes 18 adapted to slide along the upper flanges 14 of the I-beams. The base plate 20, shown circular in the drawings, is secured by bolts 22 to the top flanges 14 of the I-beams and this base plate 20 carries an upright cylinder 24, closed at the bottom by the plate 20 except for an air inlet tube 26. The air inlet tube 26 will be connected to a source of pressurized air, not shown in the drawings, and a two-way valve 27 is inserted in the tube so that air may be admitted under pressure to the cylinder 24 to force a piston 28 upwardly. Alternatively, air trapped below the piston 28 in the cylinder may escape therefrom when the valve 27 is turned in another direction, thus allowing the piston to fall, when such action is desired by the operator.

The piston 28 has oil seal rings 30 and a small volume of oil 32 will be carried by the piston, thus providing for perfect lubrication and sealing thereof. A piston rod 34 is rigidly secured to the piston 28 and is guided by a cap 36 which is apertured to receive the piston and which is screwed onto the upper end of the cylinder 24.

This cap is apertured at 38, to allow escape of air from above the piston and to allow addition to the supply of oil 32.

A valve, generally indicated by the numeral 40 is mounted on the piston 28 to provide communication between the upper and lower portions of the cylinder 24, that is, the portions of the cylinder above and below the piston 28. The valve 40 includes a hollow tube 42 with a base flange 44 at its lower closed end, a screwed nut head 46 and a spring 47 compressed between this head and a ring fitting 48. The piston 28 is of course bored to receive this valve assembly. A gasket 50 is provided between the base flange 44 and the lower surface of the piston 28, and the tube 42 is apertured at 52 near the base flange 44, so that when the piston is raised to the limit of its travel, the upper end of the valve, that is, the head 46, contacts the cap 36, depressing the tube 42 against the action of the spring 47. This shifting of the tube 42 allows air to escape from the lower portion of the cylinder 24 into the aperture 52 and upwardly through the tube 42 into the upper portion of the cylinder, providing a hissing sound which is a signal that the piston has reached the upper limit of its travel and preventing the movement of the piston to a height which would endanger the proper support of the piston and piston rod.

Figure 5:
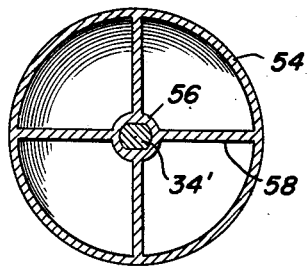
Figure 5 is a horizontal sectional view, taken on a line 5—5 in Figure 1.

A vehicle wheel support 54 of conical form, illustrated in Figures 1 and 5, is self-centering with respect to a vehicle wheel placed thereon. This support 54 is provided with a central boss 56 apertured to receive an upper end portion 34' of the piston rod 34, preferably of non-circular cross sectional shape. Radiating webs 58 provide reinforcement for the support 54 and the boss portion 56 thereof, and a plurality of coaxial grooves 60 on the upper surface of the conical support 54 are provided to receive the recessed portion 62 of a vehicle wheel. The wheel will carry a rim 64 and a tire 66, and an equalizing ring 68 is used to contact one side of this tire.

The uprights 16 are provided with a plurality of vertically and regularly spaced apertures 70 to receive headed pins 72 whereby socket portions 74 of arms 76 are vertically adjustably mounted on the uprights. The inner ends of the arms 76 are provided with notched portions 78 to receive upper edges of one of a set of interchangeable tire engaging rings 68, already referred to as an equalizing ring, since the action of the arms 76 is transmitted to the tire 66 through the agency of the ring 68. It should be noted carefully that each arm 76 is provided with a notched portion 78 in order to prevent slippage of the ring 68 on the tire 66, and in further provision against slipping of the parts involved, there is also provided means to prevent rotation of the arms 76 on the uprights 16. A simple structure to attain this end is represented in the drawings, in which the uprights and the sockets 74 are each represented as being of rectangular cross sectional shape.

The operation of this invention will be clearly understood from the foregoing description of the mechanical details thereof, taken in connection with the drawings and the recitation of objects in the preamble of this specification. In recapitulation, it may be added that when the piston 28 reaches the upper limit of its travel the valve 40 is opened so that the pressurized air in the lower portion of the cylinder 24 can escape into the upper portion of the cylinder and then escape through the aperture 38 in the cap 36 thus allowing a sudden fall in the pressure of air trapped beneath the piston 28. Due to the elasticity of the tire 66 and the weight of the tire and wheel, along with the tire support 54 and piston 28, the piston falls rapidly when the valve 40 is opened. However, if the valve 27 is allowed to remain open, the closure of the valve 40 under the action of the spring 47 will immediately cause the piston 28 to be again raised. This action will continue and a chattering analogous to a hammering on the tire 66 will result. This feature is of great importance in this invention and has been found to be very effective in loosening the tire 66 from the rim 64.

Another advantage of this invention, not previously mentioned, is that the wheel support 54 may be disposed at a height facilitating the placement of the wheel and/or tire thereon. To adjust the machine in order to avail of this feature of the invention, it is only necessary to manipulate the valve 27 in a manner to raise the wheel support 54 to the desired height, prior to the mounting of the wheel and/or tire thereon. In this connection, it may be noted that the arms 76 need not be positioned as indicated in Figure 1, since a very limited upward travel of the member 54 will suffice to loosen a tire from a rim, or alternatively, to hoist a tire onto a rim.

Obviously many minor variations may be made in the exact structural detail and proportionment of the various elements of this invention without departing from the spirit and scope thereof. Accordingly this invention should be considered as limited only by a proper interpretation of the terms used in the subjoined claim.

Having described the invention, what is claimed as new is:

A tire removing device comprising a base including a plurality of radial I-beams, uprights mounted for horizontal sliding adjustment on said I-beams and including integral, substantially C-shaped clamps on their lower ends adapted to frictionally grip the upper flanges of said I-beams and rigidly support the uprights in vertical position, said uprights having spaced openings in their upper portions, inwardly extending horizontal arms mounted for vertical sliding adjustment on the uprights, pins in the arms engageable selectively in the openings for securing said arms in adjusted position, a fluid operated jack on the base, said jack having a conical self-centering wheel support for supporting and elevating a horizontal, tire-equipped wheel, and a loose ring adapted to rest on the tire and engageable by the arms for resisting upward movement of said tire, said arms terminating in downturned free end portions having notches therein for the reception of said ring.

EARL F. WILSON.

REFERENCES CITED

The following references are of record in the file of this patent:

UNITED STATES PATENTS

| Number | Name | Date |
|---|---|---|
| 1,729,861 | Anderson | Oct. 1, 1929 |
| 2,043,169 | Hawkinson | June 2, 1936 |
| 2,146,166 | Anthony et al. | Feb. 7, 1939 |
| 2,270,657 | Kraft | Jan. 20, 1942 |
| 2,401,118 | Talley et al. | May 28, 1946 |
| 2,418,849 | Polt | Apr. 15, 1947 |
| 2,449,289 | Garey | Sept. 14, 1948 |

FOREIGN PATENTS

| Number | Country | Date |
|---|---|---|
| 575,558 | Great Britain | Feb. 22, 1946 |